US011757984B2

(12) United States Patent
Tylee et al.

(10) Patent No.: US 11,757,984 B2
(45) Date of Patent: Sep. 12, 2023

(54) PROCESSING COMMUNICATION SESSIONS (71) Applicant: METASWITCH NETWORKS LTD., Enfield (GB)

(72) Inventors: Andrew John Tylee, Enfield (GB); Paul John Brittain, Enfield (GB)

(73) Assignee: METASWITCH NETWORKS LTD., Enfield (GB)

( * ) Notice: Subject to any disclaimer, the term of this patent is extended or adjusted under 35 U.S.C. 154(b) by 0 days.

(21) Appl. No.: 17/764,431

(22) PCT Filed: Oct. 7, 2021

(86) PCT No.: PCT/US2021/054033
§ 371 (c)(1),
(2) Date: Mar. 28, 2022

(87) PCT Pub. No.: WO2022/076729
PCT Pub. Date: Apr. 14, 2022

(65) Prior Publication Data
US 2022/0365854 A1 Nov. 17, 2022

(30) Foreign Application Priority Data
Oct. 7, 2020 (GB) ...................................... 2015906

(51) Int. Cl.
*H04L 67/1008* (2022.01)
*G06F 9/455* (2018.01)
*G06F 11/20* (2006.01)
*H04M 3/51* (2006.01)
*G06F 11/14* (2006.01)
*H04L 45/302* (2022.01)

(52) U.S. Cl.
CPC ...... *H04L 67/1008* (2013.01); *G06F 9/45558* (2013.01); *G06F 11/1484* (2013.01);
(Continued)

(58) Field of Classification Search
CPC ............... H04L 67/1008; H04L 45/306; H04L 45/3065; H04L 47/28; H04L 45/22;
(Continued)

(56) References Cited

U.S. PATENT DOCUMENTS

2012/0297240 A1* 11/2012 Jalan .................... H04L 67/1008
714/E11.073
2014/0052864 A1* 2/2014 Van Der Linden ..........................
H04L 67/1097
709/226

(Continued)

OTHER PUBLICATIONS

PCT/US2021/054033—International Search Report and Written Opinion, dated Jan. 20, 2022, 14 pages.
(Continued)

*Primary Examiner* — Dady Chery
(74) *Attorney, Agent, or Firm* — Newport IP, LLC; Han K. Gim (57) ABSTRACT

A virtualized computing environment of a telecommunications network comprises a cluster of virtual machines with a one-to-one ratio of active and backup virtual machines. One or more additional clusters of virtual machines have a N-to-K ratio of active and backup virtual machines where N>K. The backup virtual machines are configured to provide failover capacity for processing communications sessions in an event of a failure of one of the active virtual machines. A cluster redundancy capability indicates the ratio of the active and backup virtual machines for that cluster. A predetermined type associated with a requested communication session is determined. A cluster having a cluster redundancy capability corresponding to the predetermined type is selected. Data for the requested communication session is sent to an active virtual machine in the selected cluster.

20 Claims, 5 Drawing Sheets (52) U.S. Cl.
CPC ........ *G06F 11/2023* (2013.01); *H04L 45/306* (2013.01); *H04M 3/5116* (2013.01); *G06F 2009/4557* (2013.01); *G06F 2009/45595* (2013.01); *G06F 2201/815* (2013.01)

(58) Field of Classification Search
CPC ... H04L 45/28; H04L 49/557; G06F 9/45558; G06F 11/1484; G06F 11/2023; G06F 2009/4557; G06F 2009/45595; G06F 2201/815; G06F 11/2041; H04M 3/5116
See application file for complete search history.

(56) References Cited

U.S. PATENT DOCUMENTS

| | | | |
|---|---|---|---|
| 2014/0115176 A1 | 4/2014 | Kamboh et al. | |
| 2017/0134483 A1* | 5/2017 | Miller | H04L 67/1031 |
| 2017/0208123 A1* | 7/2017 | Parker | G06F 16/2455 |
| 2018/0027115 A1 | 1/2018 | Kamboh et al. | |
| 2020/0177674 A1* | 6/2020 | Liu | H04L 61/5007 |

OTHER PUBLICATIONS

"Search Report Issued in UK Patent Application No. 2015906.7", dated Jul. 6, 2021, 4 Pages.

Schöller, et al., "Network Function Virtualisation (NFV); Resiliency Requirements; Draft ETSI GS NFV-REL 001", In Journal of ETSI GS NFV-REL, Issue 1, vol. 1, Jan. 2015, pp. 1-82.

Tarik, et al., "On Service Resilience in Cloud-Native 5G Mobile Systems", In Journal of IEEE Journal on Selected Areas in Communications, vol. 34, Issue 3, Mar. 2016, pp. 483-496.

\* cited by examiner

PROCESSING COMMUNICATION SESSIONS

CROSS-REFERENCE TO RELATED APPLICATION

This application is a national stage application, filed under 35 U.S.C. § 371, of International Patent Application No. PCT/US21/54033, filed on Oct. 7, 2021, which is incorporated by reference herein in its entirety.

TECHNICAL FIELD

The present disclosure relates to processing communication sessions. In particular, but not exclusively, the present disclosure relates to processing communication sessions in a virtualised environment in a telecommunications network.

BACKGROUND

Telecommunications network operators typically provide network infrastructures in which communication functions are provided by primary (referred to herein as active) nodes and secondary (referred to herein as backup, or standby) nodes. In the event of a failure in the active node for a given communication session, the network operator implements a procedure for transferring or otherwise redirecting the communication session to a backup node. Telecommunications networks typically achieve this redundancy by delivering functionality in pairs. Functions may, for example, be implemented as pairs of virtual workloads (e.g. virtual machines) in a virtualised environment in the network. Within each pair, one node is initially configured, e.g. instantiated, to operate as an active node, and the other is initially configured to operate as a backup node. User load (e.g. a communication session) is directed to the active node and processed there. The active and the backup nodes exchange communications, e.g. keep-alive messages, so that the backup can detect failure of the active node, and also state, so that the backup has the information required to take over processing from the active node if the active node fails. When the active node fails, the backup detects the failure, redirects user traffic away from the active node to itself, and takes over the data processing tasks previously performed by the active node, using the state previously replicated from the active node. As such, the node initially configured as a backup becomes an active node, and the node initially configured as an active may become a backup node (once it has recovered from the failure). This architecture is known as an 'N×(1+1)' configuration, in that there are N pairs.

However, during normal processing, the backups use and/or reserve more resources than are needed merely to perform state replication and exchange keep-alive messages. For example, during normal processing, a backup may require only a fraction (e.g. a quarter) of the resources required by an active node that is processing user load. The backup is still allocated the same amount of resources as its associated active node, however, to ensure that the backup can take over processing tasks from the active node when required to do so. This configuration therefore involves an inefficient use of resources, e.g. hardware. Such an inefficient use of resources is undesirable, particularly as the number of pairs is scaled up. This may be a particular consideration with virtualised environments, where the number of pairs of virtual workloads (acting as active/backup nodes) may be high.

It is therefore desirable to provide improved methods for processing communication sessions and/or providing redundancy in telecommunication networks, particularly those operating virtualised environments.

SUMMARY

According to a first aspect, there is provided a method of processing communication sessions in a virtualised environment in a telecommunications network, the method comprising: providing a virtualised environment comprising a first active virtual machine having a dedicated backup virtual machine and a second active virtual machine sharing a backup virtual machine with a third active virtual machine different to the second active virtual machine; at a communication session classifier, determining whether a communication session is of a predetermined type; in response to a positive determination, causing the communication session to be processed at the first active virtual machine; and in response to a negative determination, causing the communication session to be processed at the second active virtual machine.

According to a second aspect, there is provided an apparatus for use in processing communication sessions in a virtualised environment in a telecommunications network, the apparatus being configured to: provide a virtualised environment comprising a first active virtual machine having a dedicated backup virtual machine and a second active virtual machine sharing a backup virtual machine with a third active virtual machine different to the second active virtual machine; determine whether a communication session is of a predetermined type; and in response to a positive determination, cause the communication session to be processed at the first virtual machine; and in response to a negative determination, cause the communication session to be processed at the second virtual machine.

According to a third aspect, there is provided a computer program comprising a set of instructions, which, when executed by a computerised device, cause the computerised device to perform a method of processing communication sessions in a virtualised environment in a telecommunications network, the method comprising: providing a virtualised environment comprising a first active virtual machine having a dedicated backup virtual machine and a second active virtual machine sharing a backup virtual machine with a third active virtual machine different to the second active virtual machine; at a communication session classifier, determining whether a communication session is of a predetermined type; in response to a positive determination, causing the communication session to be processed at the first virtual machine; and in response to a negative determination, causing the communication session to be processed at the second virtual machine.

According to a fourth aspect, there is provided a method of processing communication sessions in a telecommunications network, the method comprising: providing an environment in the telecommunications network, the environment comprising a first active node having a dedicated backup node and a second active node sharing a backup node with a third active node different to the second active node; at a communication session classifier, determining whether a communication session is of a predetermined type; in response to a positive determination, causing the communication session to be processed at the first active node; and in response to a negative determination, causing the communication session to be processed at the second active node, wherein communication sessions of the predetermined type comprise emergency calls.

It should be appreciated that features described in relation to one aspect of the present disclosure may be incorporated into other aspects of the present disclosure. For example, a method aspect may incorporate any of the features described with reference to an apparatus aspect and vice versa.

DESCRIPTION OF THE DRAWINGS

Embodiments of the present disclosure will now be described by way of example only with reference to the accompanying schematic drawings of which.

DETAILED DESCRIPTION

Figure 1:
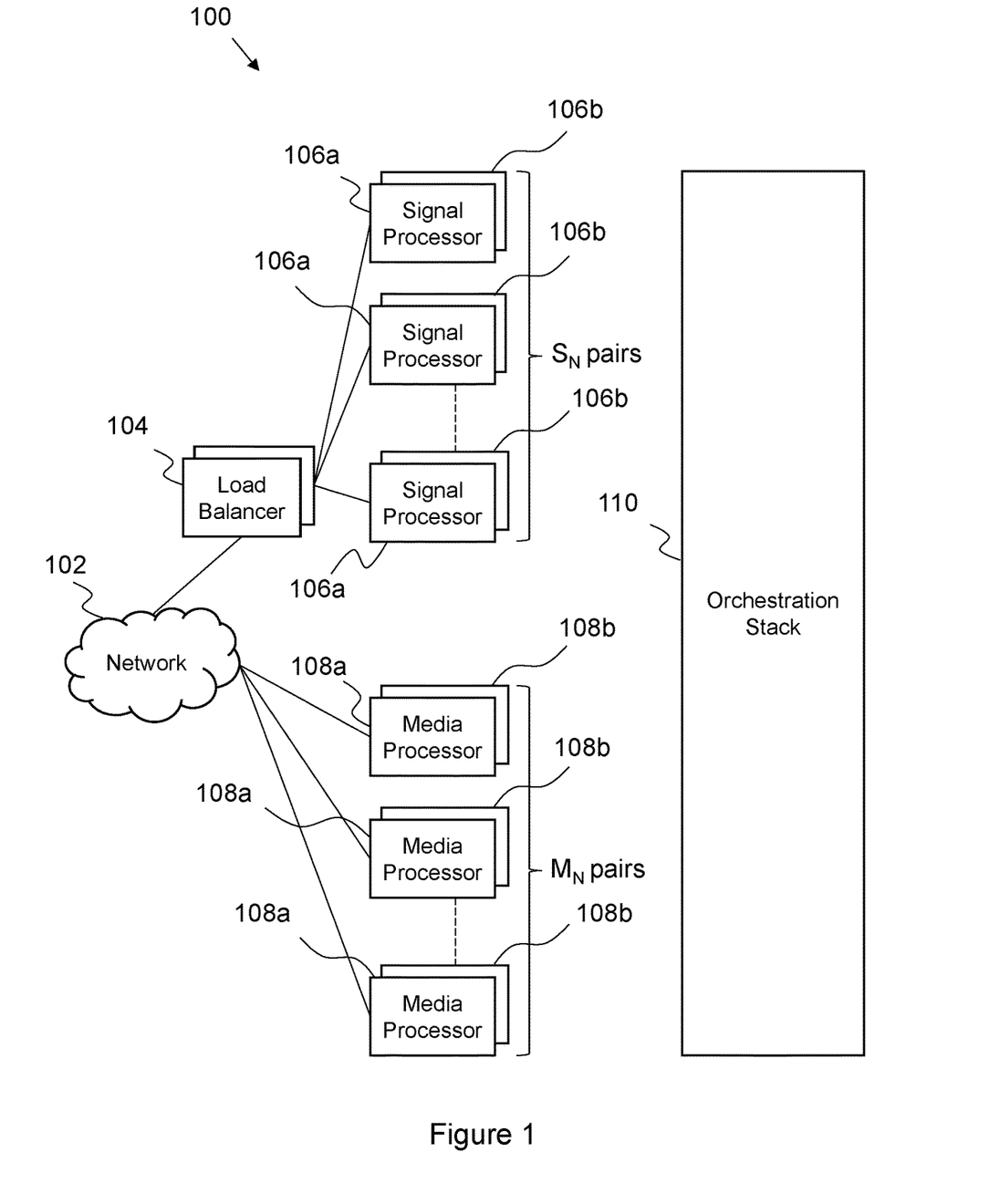
FIG. 1 is a schematic diagram of a virtualised environment in a telecommunications network according to embodiments of the present disclosure.

FIG. 1 is a schematic diagram showing a virtualised environment 100 in a telecommunications network according to embodiments.

The environment 100 comprises one or more host devices (not shown). The host device(s) may comprise servers or other such computing devices, and may be located in a data centre or cloud computing environment (either distributed or non-distributed) with one or more other host devices (not shown). A given host device includes physical processing resources, e.g. in the form of a plurality of processing cores which are capable of carrying out various data processing tasks. In some examples, the processing cores comprise central processing unit (CPU) cores. The environment 100 provides a number of virtual machines, VMs. These include active VMs and backup VMs, which may be configured (e.g. instantiated) in the environment 100. One or more VMs may be configured to operate as a virtual network function, VNF.

In this example, the VMs in the environment 100 are configured to perform as a virtualised session border controller, SBC. The VMs in the environment 100 may be configured to operate as other virtualised network functions in other examples. For example, the VMs in the environment 100 may be configured to operate as a wireless network packet core such as an Evolved Packet Core, EPC, or a part thereof such as the User Plane Function, UPF, in a 5G core or slice. In embodiments, the VMs are configured to operate as one or more application-level functions such as video conferencing services or Unified Communication, UC.

The environment 100 comprises a load balancer 104. The load balancer 104 may be implemented as a VM, for example. The load balancer 104 may comprise a Layer 7 load balancer. In embodiments, the load balancer 104 comprises a secure distribution engine, SDE. In embodiments, the environment 100 comprises a 1:1 redundant pair of load balancers 104. The load balancer 104 is configured to assign processing functions between a plurality of VMs. The VMs perform functions which may include, for example, signalling processing functions and/or media processing functions. Signalling processing functions are performed by active signalling processing VMs 106a, in a signalling plane of the environment 100. Media processing functions are performed by active media processing VMs 108a, in a media plane of the environment 100. The signalling processing VMs 106a may control use of the media processing VMs 108a for media handling.

The telecommunications network 100 also comprises an orchestration stack 110. The orchestration stack 110 is configured to orchestrate, configure and/or manage VMs in the virtualised environment 100. For example, the orchestration stack 110 may be configured to provide lifecycle management, LCM, for the VMs. Such lifecycle management may be at least partly automated. The VMs and/or the load balancer 104 are communicatively coupled to a network 102, e.g. an internet protocol, IP, network. Data relating to communication sessions may pass to and/or from the network 102.

In the example shown in FIG. 1, each of the active VMs 106a, 108a has a respective dedicated backup VM 106b, 108b. As such, there are $S_N$ pairs of signalling processing VMs 106a, 106b, and $M_N$ pairs of media processing VMs 108a, 108b. In examples where the load balancer 104 is implemented as a redundant pair of load balancing VMs, therefore, the total VM requirement for this configuration is $2\times(1+S_N+M_N)$.

Each backup VM 106b, 108b is configured to provide redundancy for its respective active VM 106a, 108a. A given active VM exchanges keep-alive messages and state with its respective dedicated backup VM. When the active VM fails, e.g. due to failure of a host device on which that active VM is running, its dedicated backup VM detects the failure, redirects traffic away from the active VM to itself, and takes over the data processing tasks previously performed by the active VM, using the state previously replicated from the active VM. This is referred to as a failover procedure between the active VM and its associated backup VM. Such a failover procedure may be triggered by the interruption of communications, such as keep-alive or heartbeat messages, between the active VM and its associated backup VM.

This architecture provides enhanced protection (e.g. seamless signalling and media failover) for calls by using 1:1 pairs of each fundamental component, using for example Layer 2 virtual IP failover, in order that cutover is fast enough to reduce and/or avoid media interruption which would otherwise cause the calling and/or called parties to hang up thinking that the call had failed.

The configuration shown in FIG. 1 is an 'N+N' or 'N×(1+1)' configuration, in that there are N pairs of VMs, each having dedicated processing resources allocated to it. Therefore, this configuration uses at least 2×N hardware resources, since the backup VMs 106b, 108b are allocated the same amount of processing resources as the active VMs 106a, 108a, to ensure that each backup VM has sufficient capacity to take over from its associated active VM when required to do so. However, as discussed above, the backup VMs use and/or reserve more resources than are needed during normal processing. Typically, only a small fraction of active VMs may fail at any given time, and so the use of resources by the backup VMs is inefficient.

Telecommunications providers typically favour the 'N×(1+1)' configuration. This is because telecommunications protocols often dictate that active servers expose a single internet protocol (IP) address for all incoming work, and provide no way to quickly spread that work across multiple IP addresses if the active server fails. The N×(1+1) model also allows rigorous telephony regulatory requirements to be met, for example to minimise the likelihood of emergency calls being cut off due to a network failure. Layer 2 virtual IP address moves may be used to achieve a fast failover in order to meet such high availability telephony requirements.

An alternative to the N×(1+1) model is an 'N+k' model, where there are N active VMs but only k backup VMs, with k<N, and any one of the k is able to handle work from any one of the N. An N+k model uses fewer hardware resources compared with the N×(1+1) model. Within the N+k model there are active/active and active/standby variants. In an active/active configuration, all N+k VMs handle load at all times, and up to k VMs can fail with their work redistributed across the remaining N VMs. In an active/standby configuration, only N VMs are active, and k VMs are idle, and when one of the N active VMs fails its entire load is redistributed to, for example, any single one of the k backup VMs.

An N+k configuration may be easy to upgrade and scale, and reduces hardware costs compared to an N×(1+1) model. However, changing an N×(1+1) architecture to an active/active N+k configuration is expensive and complex. As such, an N+k model may be complex, difficult and/or expensive to implement in a telecommunications network. In particular, some virtual network functions, such as SBCs, which have been implemented using N pairs of VMs in order to meet strict telephony availability requirements, are not easy or cheap to architecturally change to an N+k configuration. Such a change in architecture may require splitting the current stateful VNF implementation into a different stateless sharded cluster model, which is difficult and/or complicated to implement. Further, it may be difficult to achieve sufficiently fast failover between VNF instances to meet all regulatory demands if the underlying network does not support Layer 2 virtual IP address moves (which many public clouds do not). For example, moving IP addresses at Layer 3 often takes many seconds to complete, but for seamless preservation of voice media on a call the backup VM should be able to take over in less than 100 milliseconds.

Telecommunications networks may provide prioritisation of certain types or categories of communication session. This may be based on, for example, a level of service guaranteed to a network customer in a service agreement so that network customers can pay for their communication sessions to be prioritised. Alternatively, there may be licensing or regulatory requirements that a telecommunications network operator must comply with. For example, telecommunications network operators may be obliged to prioritise calls to/from emergency or healthcare services and/or to/from certain government agencies or departments. In some cases, emergency call impact is how regulators assess outage severity. As such, some types of communication session may be handled with a higher priority than other types of communication session.

Prioritisation may involve, for example, providing an agreed quality of service. In some cases, prioritisation involves providing a service in which less than an agreed percentage of communication sessions do not work as expected. In the case of telephone calls, for example, prioritisation may mean providing a service in which less than a certain percentage of calls fail during the call (drop out).

Techniques exist for providing differentiated Quality of Service (QoS) in networks. However, these are typically implemented as prioritisation of packets or static assignment of multiple paths based on the customer contract. For example, a "Gold" customer may have full 1:1 alternate paths configured at a relatively high fixed cost, whereas a "Bronze" customer may have only best-effort delivery, at a relatively low cost. These categorisations apply to all calls/sessions initiated by a specific customer. However, a regulatory requirement on the network operator may only be to limit impact on emergency calls for any network failure.

The use of mobile networks, however, has changed the end-user expectation of call reliability. A call drop on a mobile network is generally not considered by the end-user as unexpected or unacceptable, for example. These expectations may be exploited by deploying N+k non-paired (or simplex) call processing VMs, with a domain name system (DNS) or Layer 7 load balancer to ensure that an immediate redial hits an alternative node after failure. However, applying this Cloud Native approach of N+k simplex instances to voice calls would mean that calls are, by definition, lost when an instance fails. This does not satisfy the regulatory requirement on emergency call handling, and/or may not satisfy the high availability requirements for certain call types (e.g. for prioritised customers).

Embodiments of the present disclosure will now be described, which enable the hardware savings associated with using an N+k model to be achieved, without the complexity of managing a full sharding-based architecture, and whilst maintaining protection against failure, for example for emergency and/or prioritised calls. Embodiments comprise measures, including methods, apparatus and computer programs, for use in processing communication sessions in a virtualised environment in a telecommunications network.

Figure 2:
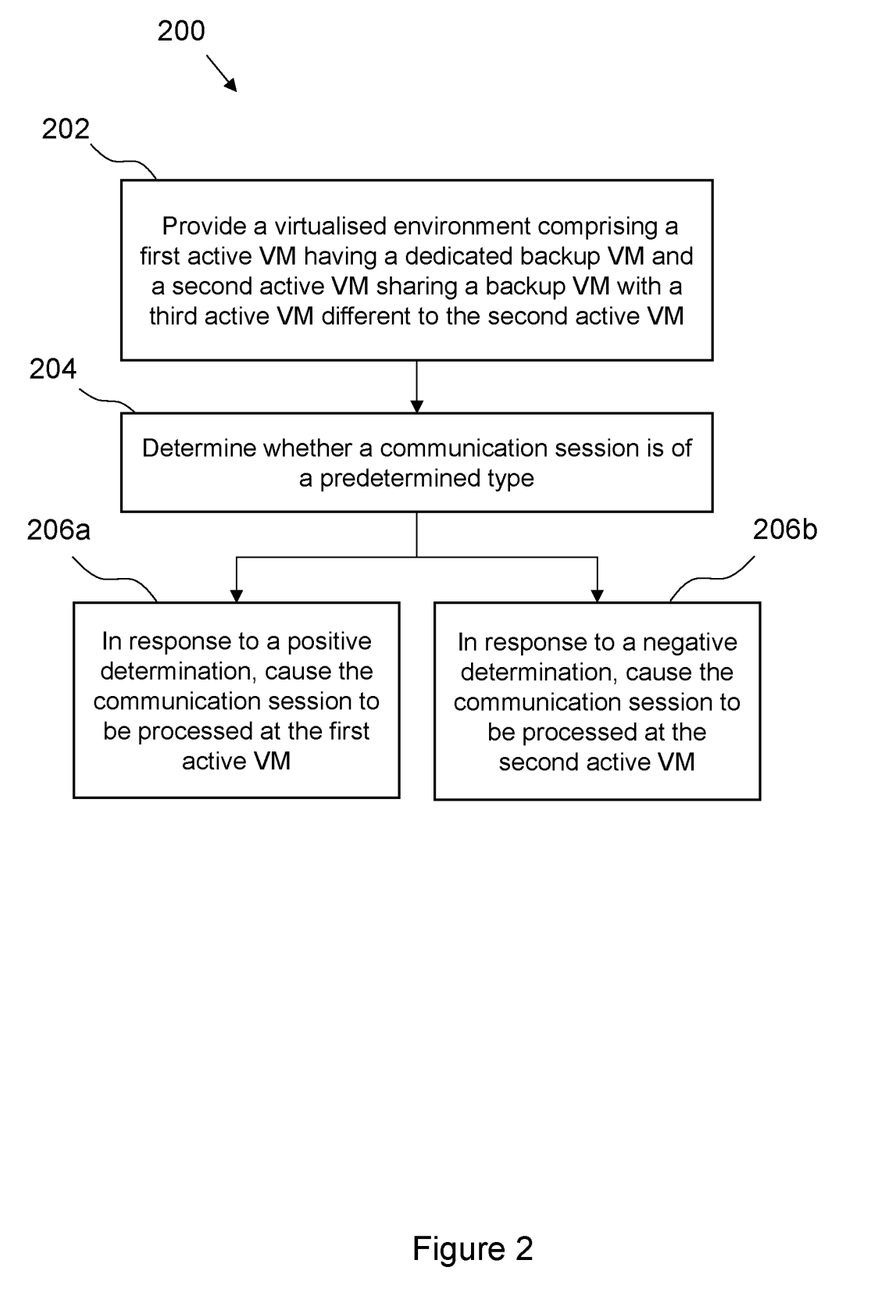
FIG. 2 is a flow chart depicting a method of processing communication sessions in a virtualised environment in a telecommunications network according to embodiments of the present disclosure.

FIG. 2 is a flow diagram showing a method 200 of processing communication sessions in a virtualised environment in a telecommunications network, according to embodiments of the present disclosure. A virtualised environment 300 in which the method 200 may be performed is shown schematically in FIG. 3. The method 200 may be performed in other environments in alternative embodiments.

At item 202 of the method 200, a virtualised environment (e.g. the virtualised environment 300 shown in FIG. 3) is provided. The virtualised environment 300 comprises a first active VM 302a having a dedicated backup VM 302b. The virtualised environment 300 also comprises a second active VM 304a. The second active VM 304a shares a backup VM 304b with a third active VM 306a. The third active VM 306a is different to the second active VM 304a. As such, the first active VM 302a has a dedicated backup VM 302b, whereas the second active VM 304a does not have a dedicated backup VM, but instead shares a backup VM 304b with at least one other active VM 306a. Although in the example shown in FIG. 3 the environment 300 is shown having three active VMs, in other examples the environment 300 may comprise any number of first active VMs 302a (having dedicated backup VMs 302b) and any number of second VMs 304a, sharing backup VMs with other active VMs 306a. The active VMs 302a, 304a, 306a and/or the backup VMs 302b, 304b may be configured to run on one or more host devices (not shown), and may be allocated physical processing resources on such host devices. In some embodiments, the active VMs 302a, 304a, 306a and/or the backup VMs 302b, 304b are configured in a distributed manner across a plurality of host devices.

Figure 3:
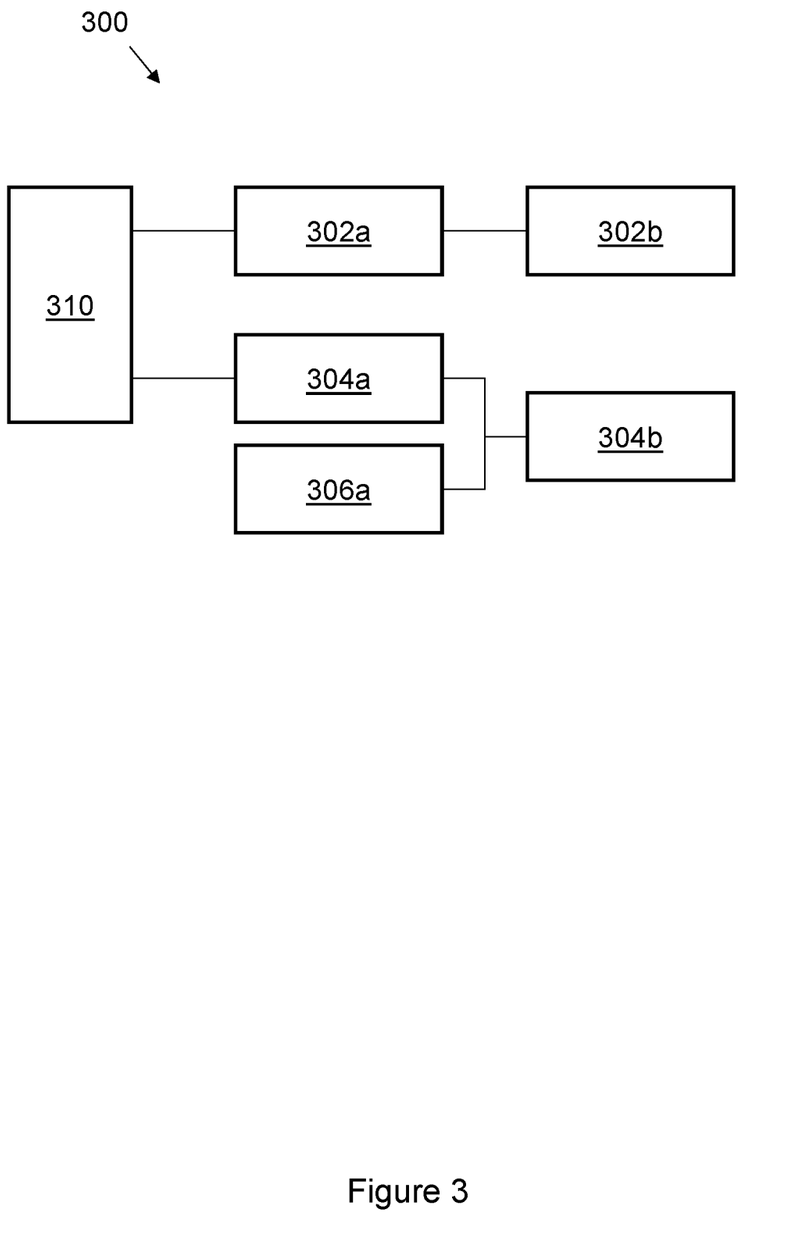
FIG. 3 is a schematic diagram of a virtualised environment in a telecommunications network according to embodiments of the present disclosure.

In embodiments, providing the virtualised environment 300 comprises instantiating the VMs in the virtualised environment 300. Providing the virtualised environment 300 may additionally or alternatively comprise allocating physical resources to the VMs, and/or associating active VMs with respective backup VMs. In embodiments, the providing step is performed at least in part by an orchestration stack, such as the orchestration stack 110 described above with reference to FIG. 1. In some embodiments, the providing step is performed at least in part by a virtualisation tool such as a hypervisor. A hypervisor may run top of an existing operating system on a respective host device, or it may run directly on the host device hardware without an intermediate operating system (in a so-called 'bare metal' configuration). In some examples, the hypervisor (not shown) comprises packet forwarding functionality. In some examples, a software tool such as OpenStack™ is used to run VMs on a respective host device with a hypervisor. In some examples, the host device is configured with a Linux kernel, and/or may host virtual workloads through use of the virtualisation tool Linux Containers (LXC).

In some embodiments, the virtualised environment 300 is configured (e.g. instantiated) prior to the method 200 being performed. That is, the virtualised environment 300 may comprise a pre-configured virtualised environment.

In embodiments, providing the virtualised environment 300 comprises providing a first cluster (not shown) of active VMs and a second cluster (not shown) of backup VMs. The active VMs in the first cluster share backup VMs in the second cluster. The number of active VMs in the first cluster is greater than the number of backup VMs in the second cluster. The second active VM 304*a* and the third active VM 306*a* are comprised in the first cluster. The backup VM 304*b* which is shared by the second active VM 304*a* and the third active VM 306*a* is comprised in the second cluster. In such embodiments, a cluster redundancy capability may be specified. The cluster redundancy capability (e.g. of the first cluster) is based on a ratio of the number of VMs in the first cluster compared to the number of VMs in the second cluster, i.e. N:k. In embodiments, at least one of the first active virtual machine and the second active virtual machine provides an SBC function in the telecommunications network. In embodiments, VMs in the first cluster provide an SBC function in the telecommunications network.

In embodiments, the environment 300 comprises a communication session classifier 310. In alternative embodiments, the communication session classifier 310 is located outside of the environment 300. The communication session classifier 310 is configured to classify communication sessions handled in the environment 300. In embodiments, the communication session classifier 310 is comprised in a load balancer, such as the load balancer 104 described with reference to FIG. 1. For example, the communication session classifier 310 may be comprised in a Layer 7 load balancer. Such a load balancer may front (i.e. be arranged in front of) the active and/or backup VMs in the environment 300. In some embodiments, the communication session identifier 310 is comprised in a DNS load balancer. For example, the communication session classifier 310 may be comprised in a Layer 3 load balancer. In alternative embodiments, the communication session classifier 310 is not comprised in a load balancer. For example, the communication session classifier 310 may comprise an independent logical and/or physical function. In some cases, the communication session classifier 310 is comprised in at least one of the VMs in the environment 300, for example the first active VM 302*a* and/or the second active VM 304*a*.

At item 204, the communication session classifier 310 determines whether a communication session is of a predetermined type.

In embodiments, communication sessions of the predetermined type comprise communication sessions having a higher priority than communication sessions which are not of the predetermined type. In some embodiments, communication sessions of the predetermined type comprise emergency calls. For example, communication sessions of the predetermined type may comprise communication sessions involving an emergency telephony service. In embodiments, communication sessions of the predetermined type are instigated by and/or to be received by a prioritised customer of the telecommunications network operator, compared to communication sessions which are not of the predetermined type. In embodiments, communication sessions of the predetermined type comprise over-the-top, OTT, communication sessions.

In embodiments, the communication session classifier 310 determines whether the communication session is of a first predetermined type or a second predetermined type, different from the first predetermined type. That is, the communication session classifier 310 may be configured to distinguish between different types of communication sessions. Examples of communication sessions include, but are not limited to, voice calls, video calls, instant messaging sessions, data communication sessions and multi-party calls and/or sessions. Communication sessions may comprise inbound calls, outbound calls, and/or any portion (e.g. hop) of a call. For example, a given communication session may comprise a call hop between different network elements, network segments, and/or networks, e.g. between a gateway element and an IP Multimedia Core Network Subsystem, IMS.

At item 206*a*, in response to a positive determination at item 204, the communication session is caused to be processed at the first active VM 302*a* (that is, an active VM having a dedicated backup VM).

In embodiments, causing the communication session to be processed at the first active VM 302*a* comprises routing communication sessions of the predetermined type to the first active VM 302*a*. For example, in embodiments where the communication session classifier 310 is located in a load balancer, causing the communication session to be processed at the first active VM 302*a* comprises routing, at the load balancer, communication sessions of the predetermined type to the first active VM 302*a*. Routing may be performed using a domain name, for example a fully qualified domain name, FQDN. In embodiments, routing comprises application-aware routing.

In embodiments where the communication session classifier 310 is located in the first active VM 302*a*, causing the communication session to be processed at the first active VM 302*a* comprises the first active VM 302*a* processing the communication session itself, rather than redirecting the communication session to another active VM. In embodiments where the communication session classifier 310 is located in the second active VM 304*a*, causing the communication session to be processed at the first active VM 302*a* comprises the second active VM 304*a* redirecting the communication session to the first active VM 302*a*.

At item 206*b*, in response to a negative determination at item 204, the communication session is caused to be processed at the second active VM 304*a* (that is, an active VM sharing a backup VM with one or more other active VMs).

In embodiments, causing the communication session to be processed at the second active VM 304*a* comprises routing communication sessions which are not of the predetermined type to the second active VM 304*a*. For example, in embodiments where the communication session classifier 310 is located in a load balancer, causing the communication session to be processed at the second active VM 304*a* comprises routing, at the load balancer, communication sessions which are not of the predetermined type to the second active VM 304a.

In embodiments where the communication session classifier 310 is located in the first active VM 302a, causing the communication session to be processed at the second active VM 304a comprises the first active VM 302a redirecting the communication session to the second active VM 304a. In embodiments where the communication session classifier 310 is located in the second active VM 304a, causing the communication session to be processed at the second active VM 304a comprises the second active VM 304a processing the communication session itself, rather than redirecting the communication session to another active VM.

By processing communication sessions in the above-described manner, the virtualised environment 300 can comply with high availability requirements for an identified subset of calls/sessions (e.g. emergency calls), whilst achieving hardware savings associated with using an N+k model. In other words, a high availability N+k configuration can be implemented using simplex instances of session processors, which provides a hardware benefit over N×(1+1) configurations while still offering full call-state and/or media-path preservation for certain call/session types, such as emergency calls. Further, the need to completely re-architect a VNF design (e.g. codebase) using complex sharding and flow steering techniques is avoided, thereby reducing cost, time and complexity of implementation. Embodiments described herein are also conceptually easier to understand than the full sharding approach to implementing an N+k model. This facilitates uptake for network operators in moving from appliance-based to cloud-based models.

By adding an additional session classifier, for example to a load balancer fronting an SBC cluster, calls can be steered to either an N+k cluster of simplex instances (where each active VM does not have a dedicated backup VM), which offers a lower level of protection for calls, or a 1:1 high availability cluster providing a more seamless failover for those calls requiring such enhanced protection. This reduces the hardware requirements compared to a pure N×(1+1) model. By reducing the hardware requirements, fewer physical servers may be used, which reduces costs as well as power usage, thereby improving ecological sustainability.

Existing N×(1+1) implementations of a VNF may already be able to operate in a simplex mode, as they must support this during failover/recovery events when, for example, one server in a pair has failed and the other server in the pair is assuming the processing load while the failed server reboots. Therefore, modifying existing VNFs which use an N×(1+1) configuration to implement the methods described herein is less complex than, for example, splitting an existing stateful VNF implementation into a different stateless sharded cluster model. Protection for all calls could, alternatively, be achieved using a sharding and Layer 3/Layer 7 load balancer to steer calls across a cluster of processing units with reflow by the load balancer after failure. However, this requires re-implementing the signalling processing and media processing layers to split them into more microservices, which is expensive and complicated. This alternative process may also require tailoring for different VNF types, adding to the cost and complexity. In contrast, the embodiments described herein are applicable to a generic implementation in the load balancer (or as a separate classifier function) which can offer enhanced protection and hardware savings to multiple VNF types.

Embodiments described herein allow a single network function to utilise multiple high availability redundancy models for one or more microservices on a dynamic basis, per communication session, e.g. on a call-by-call basis. For network operators, this means that resources can be saved by using only enough 1:1 redundant pairs needed to meet regulations and/or service agreements. Design complexity is also reduced compared to a case in which split networks are used. For customers, critical and/or high priority services can still receive appropriate protection (e.g. for emergency calls). For vendors, implementation effort and/or complexity is reduced compared to having to build a more complex high availability N+k architecture at scale.

In embodiments, the determination performed at item 204 is made on the basis of a telephone number associated with the communication session. The telephone number may be associated with a calling party and/or a called party. The telephone number may indicate that the communication session comprises an emergency telephone call, for example. As such, the communication session can be assigned to either the first active VM 302a (having a dedicated backup VM 302b) or the second active VM 302b (not having a dedicated backup VM) based on the telephone number associated with the communication session. Therefore, an assignment is performed on a call-by-call basis, as opposed to a static pre-configured assignment.

In embodiments, the determination performed at item 204 is made on the basis of one or more dialling digits. The one or more dialling digits may comprise a string of digits. In embodiments, the one or more dialling digits are part of a dialed telephone number. In some examples, the one or more dialling digits are part of an extension number. The one or more dialling digits may be used to identify the communication session as a high priority communication session. In embodiments, the one or more dialling digits comprise an emergency identifier, e.g. '999' or '911'.

In embodiments, the determination performed at item 204 is made on the basis of a communication session source priority. The communication session source priority may indicate a priority of a calling party. The priority of the calling party may be changed dynamically. In embodiments, the communication session source priority comprises a calling party identifier. The communication session source priority may indicate, for example, that the calling party is a Government Emergency Telecommunications Service, GETS, calling party. In some cases, the communication source priority indicates that the calling party has paid for an enhanced reliability service. As such, enhanced call reliability can be maintained, through use of the first active VM 302a having a dedicated backup VM 302b, for communication sessions originating from a high-priority source.

In embodiments, the determination performed at item 204 is made on the basis of a communication session destination priority. The communication session destination priority may indicate a priority of a called party. The priority of the called party may be changed dynamically. In embodiments, the communication session destination priority comprises a called party identifier. The communication session destination priority may indicate, for example, that the called party is a Government Emergency Telecommunications Service, GETS, called party. In some cases, the communication destination priority indicates that the called party has paid for an enhanced reliability service. As such, enhanced call reliability can be maintained, through use of the first active VM 302a having a dedicated backup VM 302b, for communication sessions involving a high-priority destination.

In embodiments, the determination performed at item 204 is made on the basis of a billing history. For example, a calling party and/or called party may pay for a service in which calls are handled with enhanced reliability, using the first active VM 302a having a dedicated backup VM 302b. Such calls are identified by the communication session classifier 310, on a call-by-call basis. If the billing history indicates that the calling party and/or called party have not paid for such a priority service, the call may be assigned to the second active VM 304a (without a dedicated backup VM).

In embodiments, the determination performed at item 204 is made on the basis of an access point name, APN. In some embodiments, the determination performed at item 204 is made on the basis of an indicator associated with and/or received from an Evolved Packet Core, EPC.

The determination performed at item 204 may be made on the basis of more than one of the factors described above in some embodiments. Other examples of factors on which the determination may be based include, but are not limited to, location, network congestion, and access network and/or slice used.

In embodiments, at least one redundancy capability attribute is received. The at least one redundancy capability attribute may be received from at least one of the first active VM 302a and the second active VM 304a. As such, the first active VM 302a and/or the second active VM 304a may report a respective redundancy capability attribute. A redundancy capability attribute indicates whether a given active VM has a dedicated backup VM. In the example shown in FIG. 3, therefore, a redundancy capability attribute reported by the first active VM 302a indicates that the first active VM 302a has a dedicated backup VM 302b, whereas a redundancy capability attribute reported by the second active VM 304a indicates that the second active VM 304a does not have a dedicated backup VM. In some embodiments, one of the first and second active VMs 302a, 304a, e.g. the first active VM 302a, reports a redundancy capability attribute for another of the first and second active VMs 302a, 304a, e.g. the second active VM 304a. In some cases, one or more of the first and second active VMs 302, 304a report a redundancy capability attribute for the third active VM 306a. The first and/or second active VMs 302a, 304a may report the redundancy capability attribute(s) to the load balancer, communication session classifier, and/or a further VM, for example. In alternative embodiments, the redundancy capability attribute(s) are received from an orchestration stack. In some cases, a redundancy capability attribute indicates a redundancy capability of more than one active VM.

In embodiments, causing the communication session to be processed at the first active VM 302a and/or causing the communication session to be processed at the second active VM 304a is dependent on the received redundancy capability attribute(s). As such, it may be first determined whether a communication session is of a predetermined type, and then further determined which active VM is preferred for processing the communication session, based on the redundancy capability attributes of the different active VMs. In other words, the reported redundancy capability attributes enable different VMs to be distinguished, and assigned communication sessions of different types, based on their redundancy capabilities. In the example shown in FIG. 3, the redundancy capability attribute of the first active VM 302a, indicating that the first active VM 302a has a dedicated backup VM 302b, enables the first active VM 302a to be identified as being suitable for processing the communication session that is of the predetermined type (e.g. an emergency call).

In embodiments, the redundancy capability attribute of a given active VM is dynamic, i.e. changes over time. For example, a given active VM may be provided with a dedicated backup VM during a first time period and not during a second time period. As such, a redundancy capability attribute is indicative of a current redundancy capability of the given active VM. An orchestration stack, such as the orchestration stack 110 described with reference to FIG. 1, may modify the redundancy capability of a given VM. In alternative embodiments, the redundancy capability of a given active VM is static, i.e. does not change over time.

In embodiments, causing the communication session to be processed at the first active VM 302a and/or causing the communication session to be processed at the second active VM 304a is dependent on a cluster redundancy capability of a cluster including the second active VM 304a and the third active VM 306a. Such a cluster redundancy capability is based on a ratio of N:k, i.e. the number of VMs that share backup VMs compared to the number of shared backup VMs. For example, a communication session of a given type may be routed to the second active VM 304a if it is determined that the cluster redundancy capability of the cluster comprising the second active VM 304a is sufficient for the given type of communication session.

In embodiments, one or more of the first and second active VMs 302a, 304a are configured to provide a signalling plane processing function for communication sessions. For example, one or more of the first and second active VMs 302a, 304a may comprise signalling session controllers, SSCs. In some such embodiments, the communication session classifier 310 is located in the signalling plane processing function. As such, communication sessions may be directed at the signalling layer to different VMs having different redundancy capabilities.

In embodiments, one or more of the first and second active VMs 302a, 304a are configured to provide a media plane processing function for communication sessions. For example, one or more of the first and second active VMs 302, 304a may comprise media session controllers, MSCs. In some such embodiments, the communication session classifier 310 is located in the media plane processing function. As such, communication sessions may be directed at the media layer to different VMs having different redundancy capabilities.

In embodiments, in response to identifying that a first process performed by the first active VM 302a has failed, a first failover procedure is performed. The first failover procedure comprises configuring the first process to be performed by the dedicated backup VM 302b. In embodiments, the first failover procedure comprises the backup VM 302b redirecting traffic away from the first active VM 302a towards itself. The first failover procedure may be performed in response to interruption of communications, e.g. keep-alive messages, between the first active VM 302a and the dedicated backup VM 302b. In embodiments, as part of the first failover procedure, the first active VM 302a becomes a backup VM, and the dedicated backup VM 302b becomes an active VM.

In embodiments, in response to identifying that a second process performed by the second active VM 304a has failed, a second failover procedure is performed. The second failover procedure comprises configuring the second process to be performed by the backup VM 304b that is shared with the third active VM 306a. In embodiments, the second failover procedure comprises the backup VM 304b redirecting traffic away from the second active VM 304a towards itself. In embodiments, as part of the second failover procedure, the second active VM 304a becomes a backup VM, and the shared backup VM 304b becomes an active VM. In some embodiments, if the second active VM 304a and the third active VM 306a both fail simultaneously, only one of the second active VM 304a and the third active VM 306a can failover, e.g. using the shared backup VM 304b. In alternative embodiments, both the second active VM 304a and the third active VM 306a can failover. For example, the second active VM 304a and the third active VM 306a may share more than one backup VM, which allows more than one of the active VMs 304a, 306a to failover simultaneously.

In embodiments, at least one of the first, second and third active VMs 302a, 304a, 306a is configured to run on a dedicated physical server. In embodiments, each of the first, second and third active VMs 302a, 304a, 306a is configured to run on a respective dedicated physical server. In embodiments, at least one of the backup VMs 302b, 304b is configured to run on a dedicated physical server. In embodiments, each of the backup VMs 302b, 304b is configured to run on a dedicated physical server. In alternative embodiments, at least one of the VMs 302a, 304a, 306a, 302b, 304b is configured to run on a physical server shared with at least one other of the VMs 302a, 304a, 306a, 302b, 304b.

Figure 4:
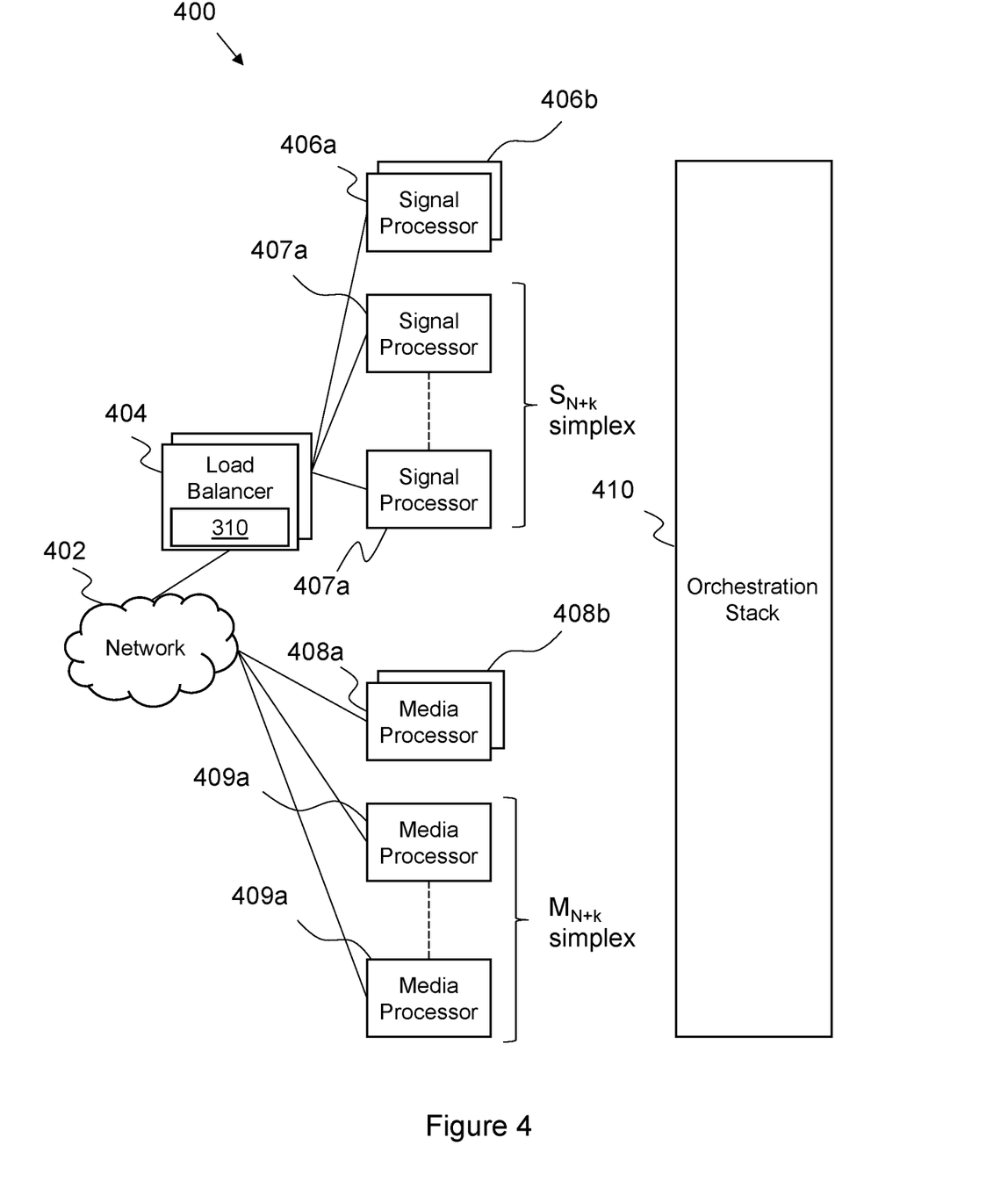
FIG. 4 is a schematic diagram of a virtualised environment in a telecommunications network according to embodiments of the present disclosure.

FIG. 4 is a schematic diagram showing a virtualised environment 400 in a telecommunications network, according to embodiments of the present disclosure. Some items in FIG. 4 are similar to items described with reference to FIG. 1 above. Corresponding reference numerals, incremented by 300, are used for similar items. In embodiments, the method 200 described above with reference to FIG. 2 may be implemented using the virtualised environment 400.

In the embodiments of FIG. 4, the load balancer 404 comprises the communication session classifier 310. The load balancer 404 is thus configured to classify communication sessions based on, for example, a dialed number. Emergency and/or high priority calls are identified, and routed to a 1:1 high availability signalling processing VM 406a (which has a dedicated backup VM 406b), and its associated media processing VM 408a (which has a dedicated backup VM 408b). This provides enhanced protection for such identified calls. In this example, a single pair of 1:1 high availability VMs are used for each of the signalling processing plane and media processing plane, but in other examples a cluster of multiple pairs of 1:1 high availability VMs may be used.

Calls which are not identified as emergency and/or high priority calls are routed to a cluster of $S_{N+k}$ simplex signalling processing VMs 407a, which control a cluster of $M_{N+k}$ media processing VMs 409a. A given signalling processing VM may comprise an SSC, and a given media processing VM may comprise an MSC.

In embodiments, the signalling processing and media processing clusters 407a, 409a comprise spare capacity (i.e. "+k") to allow a predetermined number of VMs in the cluster(s) to fail and recover. In some cases, the k VMs are comprised in a separate cluster of VMs. A ratio of N:k may be chosen based on the expected risk of VM failure, the speed of recovery, and/or data centre reliability, for example. An example of such a ratio is 10:1, i.e. k=0.1 N. In this example, the cluster redundancy capability is 10%, since failure of 10% of the N active VMs can be handled simultaneously. Other ratios may be used in other examples. In embodiments, the ratio of N:k is the same for signalling processing VMs and media processing VMs. In alternative embodiments, the ratio of N:k for signalling processing VMs is different from the ratio of N:k for media processing VMs. The media processing layer may comprise the same, more or fewer overall VMs than the signalling processing layer.

The total VM requirement in the example shown in FIG. 4 is $2 \times (1+1+1) + S_{N+k} + M_{N+k}$. This is smaller than the total VM requirement for the environment 100 described with reference to FIG. 1 above. Since each VM is configured to use specified hardware resources, reducing the number of VMs in the virtualised environment allows for a saving in used and/or reserved hardware resources.

As such, an N+k pool of simplex VMs 407a, 409a can be used for the bulk of traffic in the environment 400, whereas certain identified calls/sessions are passed instead to a smaller cluster of 1:1 VMs 406a, 408a. In this manner, enhanced protection is provided for certain communication sessions, such as emergency calls, while a lower level of protection allowing immediate redial after failure is provided to other communication sessions.

In embodiments, the VMs in the environment 400 are under automated LCM by the orchestration stack 410. If any VM fails, it can be automatically recovered. For example, if a host server fails, the orchestration stack 410 is configured to re-instantiate any failed VMs on alternate servers.

In embodiments, a given active media processing VM 408a, 409a reports its current redundancy capability, for example as a redundancy capability attribute, to a respective signalling processing VM 406a, 407a, and/or the load balancer 404. The current redundancy capability indicates whether the given active media processing VM has a dedicated backup VM, or whether the given active media processing VM is a simplex VM (i.e. not having a dedicated backup VM). The redundancy capability for the given active media processing VM 408a, 409a may be dynamic, i.e. may change over time. The given active media processing VM 408a, 409a may be assigned a communication session of the predetermined type (e.g. by a signalling processing VM) if the current redundancy capability of the given active media processing VM 408a, 409a indicates that the given active media processing VM has a dedicated backup VM. A given signalling processing VM may, for example, be configured with a 'prefer redundant media processing VMs' attribute, which may be used to preferentially assign priority communication sessions to media processing VMs having dedicated backup VMs. In some embodiments, a given signalling processing VM may be configured to preferentially assign non-priority communication sessions to simplex media processing VMs.

In embodiments, a given active signalling processing VM 406a, 407a reports its current redundancy capability, for example as a redundancy capability attribute, to the load balancer 404. The current redundancy capability indicates whether the given active signalling processing VM has a dedicated backup VM, or whether the given active signalling processing VM is a simplex VM (i.e. not having a dedicated backup VM). The redundancy capability for the given active signalling processing VM 406a, 406a may be dynamic, i.e. may change over time. Communication sessions may be assigned by the load balancer 404 to the given active signalling processing VM 406a, 407a based on its current redundancy capability. For example, high priority sessions may be preferentially assigned to signalling processing VMs having a dedicated backup VM, whereas low priority sessions may be preferentially assigned to simplex signalling processing VMs. Assigning of communication sessions may be further based on the capacity of a given signalling processing VM and/or a given media processing VM, in some embodiments. In some embodiments, outbound communication sessions which are identified as high-priority are routed using an FQDN which resolves only to active signalling processing VMs having a dedicated backup VM (and not to active simplex signalling processing VMs). In some embodiments, different groups of back-ends are provided for priority and non-priority communication sessions.

Figure 5:
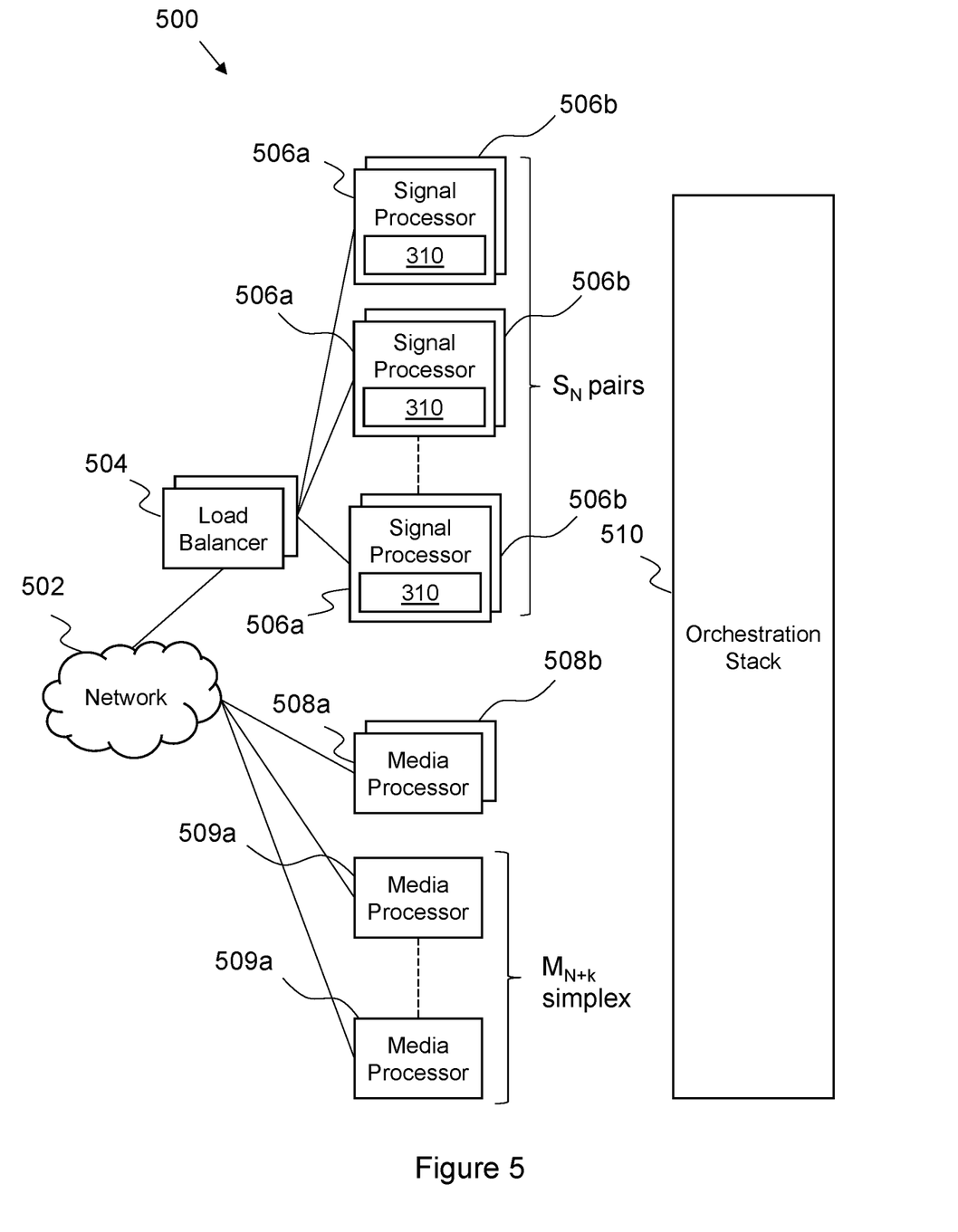
FIG. 5 is a schematic view of a virtualised environment in a telecommunications network according to embodiments of the present disclosure.

FIG. 5 is a schematic diagram showing a virtualised environment 500 in a telecommunications network, according to embodiments of the present disclosure. Some items in FIG. 5 are similar to items described with reference to FIG. 1 above. Corresponding reference numerals, incremented by 400, are used for similar items. In embodiments, the method 200 described above with reference to FIG. 2 may be implemented using the virtualised environment 500.

In the embodiments shown in FIG. 5, an N×(1+1) configuration is used for the signalling processing VMs 506a, 506b. As such, the environment 500 comprises $S_N$ pairs of signalling processing VMs, each pair comprising an active VM 506a and a dedicated backup VM 506b. Hence, 1:1 redundancy is retained for the signalling processing plane. The media processing plane, however, comprises a first VM 508a, having a dedicated backup VM 508b, for high priority and/or emergency calls, and a cluster of $M_{N+k}$ simplex VMs 509a for the bulk of calls. The total number of VMs used in this example is therefore $2 \times (1+1+S_N) + M_{N+k}$. This represents a reduction in the number of VMs (and thus hardware resources used and/or reserved) compared to the example shown in FIG. 1.

In the embodiments shown in FIG. 5, the load balancer 510 does not comprise a communication session classifier. Instead, the signalling processing VMs 506a comprise communication session classifiers 310. In such embodiments, a given signalling processing VM 506a determines whether a communication session is of a predetermined type (e.g. an emergency call). In response to a positive determination, the signalling processing VM 506a causes the first VM 508a in the media processing layer to process the communication session, with enhanced reliability due to the 1:1 redundancy of the first VM 508a. In response to a negative determination, the signalling processing VM 506a causes at least one of the $M_{N+k}$ simplex VMs 509a to process the communication session.

Various entities and/or functions described above may be comprised in or implemented in apparatus comprising at least one processor or processing system. Examples of such entities and/or functions include, but are not limited to, the virtualised environments 100, 300, 400, 500, the VMs 106a, 106b, 108a, 108b, 302a, 302b, 304a, 304b, 306a, 406a, 406b, 407a, 408a, 408b, 409a, 506a, 506b, 508a, 508b, 509a, the classifier 310, and/or the load balancers 104, 404, 504. Such a processing system may comprise one or more processors and/or memory. Each device, module, component, machine or function as described in relation to any of the examples described herein, for example the classifier 310, may similarly comprise a processor and/or processing system or may be comprised in apparatus comprising a processor and/or processing system. One or more aspects of the embodiments described herein comprise processes performed by apparatus. In some examples, the apparatus comprises one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device, etc.

Whilst the present disclosure has been described and illustrated with reference to particular embodiments, it will be appreciated by those of ordinary skill in the art that the present disclosure lends itself to many different variations not specifically illustrated herein. By way of example only, certain possible variations will now be described.

In embodiments, a load balancer determines whether a communication session is of a predetermined type, and in response to a positive determination, routes the communication session to a 1:1 redundant pair of signalling processing VMs, which use a 1:1 redundant pair of media processing VMs. In alternative embodiments, the load balancer routes the communication session to any signalling processing VM, and if the communication session is routed to a simplex signalling processing VM, the simplex signalling processing VM redirects the communication session to the 1:1 redundant pair of signalling processing VMs. Alternatively, the simplex signalling processing VM may redirect the communication session via the load balancer, for routing to the 1:1 redundant pair.

In embodiments, the load balancer determines whether a communication session is of a predetermined type, and in response to a negative determination, routes the communication session to a simplex VM. In alternative embodiments, the load balancer routes the communication session to any VM, and if the communication session is routed to a VM having a dedicated backup VM, that VM redirects the communication session to a simplex VM. Alternatively, the VM having the dedicated backup VM may redirect the communication session via the load balancer, for routing to a simplex VM.

In embodiments, the virtualised environment 300 comprises first and second VMs 302a, 304a. In alternative embodiments, the virtualised environment comprises one or more containers. VMs and containers are examples of virtual workloads. The methods described herein may be applied to containers in addition to, or alternatively to, VMs. That is, communication sessions may be allocated to different containers having different redundancy capabilities based on whether the communication session is of a predetermined type. Containers may be configured using Kubernetes™ functionality on a bare metal host, for example.

In alternative embodiments, the communication session classifier 310 comprises a plurality of classifier functions. The plurality of classifier functions may comprise a nested set of classifier functions. Different classifier functions in the plurality of classifier functions may classify communication sessions based on different factors. For example, a first classifier function may classify communication sessions based on one more dialed digits, and a second classifier function may classify communications based on a billing history. At least one of the plurality of classifier functions may be local (e.g. comprised in a load balancer of the environment 300). At least one of the plurality of classifier functions may be remote (e.g. not comprised in the environment 300). The use of a plurality of classifier functions, some local and some remote, may enable high-priority sessions to best survive distributed denial-of-service, DDOS, overloads.

Various measures (including methods, apparatus and computer programs) are provided for processing communication sessions in a virtualised environment in a telecommunications network. The virtualised environment comprises a first active virtual machine having a dedicated backup virtual machine and a second active virtual machine sharing a backup virtual machine with a third active virtual machine different to the second active virtual machine. At a communication session classifier, it is determined whether a communication session is of a predetermined type. In response to a positive determination, the communication session is caused to be processed at the first active virtual machine. In response to a negative determination, the communication session is caused to be processed at the second active virtual machine.

Various measures (including methods, apparatus and computer programs) are provided for processing communication sessions in a telecommunications network. An environment in the telecommunications network is provided, the environment comprising a first active node having a dedicated backup node and a second active node sharing a backup node with a third active node different to the second active node. At a communication session classifier, it is determined whether a communication session is of a predetermined type. In response to a positive determination, the communication session is caused to be processed at the first active node. In response to a negative determination, the communication session is caused to be processed at the second active node. Communication sessions of the predetermined type comprise emergency calls. In embodiments, at least one of the first, second and third active nodes comprises a virtual machine. In embodiments, at least one of the first, second and third active nodes comprises a physical server. As such, at least one of the active nodes may comprise a virtual machine and at least one other of the active nodes may comprise a physical server. Alternatively, all of the active nodes may comprise virtual machines, or all of the active nodes may comprise physical servers. In alternative embodiments, communication sessions of the predetermined type comprise communication sessions other than emergency calls.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of embodiments, which is defined in the accompanying claims.

The disclosure presented herein also encompasses the subject matter set forth in the following clauses:

Clause 1. A method of processing communication sessions in a virtualised environment in a telecommunications network, the method comprising:

providing a virtualised environment comprising a first active virtual machine having a dedicated backup virtual machine and a second active virtual machine sharing a backup virtual machine with a third active virtual machine different to the second active virtual machine;

at a communication session classifier, determining whether a communication session is of a predetermined type;

in response to a positive determination, causing the communication session to be processed at the first active virtual machine; and in response to a negative determination, causing the communication session to be processed at the second active virtual machine.

Clause 2. A method according to clause 1, wherein communication sessions of the predetermined type comprise communication sessions having a higher priority than communication sessions which are not of the predetermined type.

Clause 3. A method according to clause 1 or 2, wherein communication sessions of the predetermined type comprise emergency calls.

Clause 4. A method according to any preceding clause, wherein the communication session classifier is located in a load balancer, and wherein causing the communication session to be processed at the first active virtual machine comprises routing, at the load balancer, communication sessions of the predetermined type to the first active virtual machine.

Clause 5. A method according to clause 4, wherein causing the communication session to be processed at the second active virtual machine comprises routing, at the load balancer, communication sessions which are not of the predetermined type to the second active virtual machine.

Clause 6. A method according to any preceding clause, comprising receiving at least one redundancy capability attribute indicating whether at least one of the first and second active virtual machines has a dedicated backup virtual machine, wherein causing the communication session to be processed at the first active virtual machine and/or causing the communication session to be processed at the second active virtual machine is dependent on the at least one received redundancy capability attribute.

Clause 7. A method according to any preceding clause, wherein one or more of the first and second active virtual machines are configured to provide a signalling plane processing function for communication sessions.

Clause 8. A method according to clause 7, wherein the communication session classifier is located in the signalling plane processing function.

Clause 9. A method according to any preceding clause, wherein one or more of the first and second active virtual machines are configured to provide a media plane processing function for communication sessions.

Clause 10. A method according to clause 9, wherein the communication session classifier is located in the media plane processing function.

Clause 11. A method according to any preceding clause, wherein the providing comprises providing a first cluster of active virtual machines and a second cluster of backup virtual machines, the active virtual machines in the first cluster sharing the backup virtual machines in the second cluster, the number of active virtual machines in the first cluster being greater than the number of backup virtual machines in the second cluster, and wherein the second active virtual machine and the third active virtual machine are comprised in the first cluster and the backup virtual machine is comprised in the second cluster, the method comprising specifying a cluster redundancy capability based on a ratio of the number of virtual machines in the first cluster compared to the number of virtual machines in the second cluster.

Clause 12. A method according to any preceding clause, wherein at least one of the first active virtual machine and the second active virtual machine provides a session border controller, SBC, function in the telecommunications network.

Clause 13. A method according to any preceding clause, comprising, in response to identifying that a first process performed by the first active virtual machine has failed, performing a first failover procedure comprising configuring the first process to be performed by the dedicated backup virtual machine.

Clause 14. A method according to any preceding clause, comprising, in response to identifying that a second process performed by the second active virtual machine has failed, performing a second failover procedure comprising configuring the second process to be performed by the backup virtual machine shared with the third active virtual machine.

Clause 15. A method according to any preceding clause, wherein the determination is made on the basis of a telephone number associated with the communication session.

Clause 16. A method according to any preceding clause, wherein the determination is made on the basis of one or more dialling digits.

Clause 17. A method according to any preceding clause, wherein the determination is made on the basis of a communication session source priority.

Clause 18. A method according to any preceding clause, wherein the determination is made on the basis of a communication session destination priority.

Clause 19. A method according to any preceding clause, wherein the determination is made on the basis of a billing history.

Clause 20. A method according to any preceding clause, wherein at least one of the first, second and third active virtual machines is configured to run on a dedicated physical server.

Clause 21. A method according to any preceding clause, wherein each of the first, second and third active virtual machines is configured to run on a respective dedicated physical server.

Clause 22. Apparatus for use in processing communication sessions in a virtualised environment in a telecommunications network, the apparatus being configured to:
provide a virtualised environment comprising a first active virtual machine having a dedicated backup virtual machine and a second active virtual machine sharing a backup virtual machine with a third active virtual machine different to the second active virtual machine;
at a communication session classifier, determine whether a communication session is of a predetermined type; and
in response to a positive determination, cause the communication session to be processed at the first virtual machine; and
in response to a negative determination, cause the communication session to be processed at the second virtual machine.

Clause 23. A computer program comprising a set of instructions, which, when executed by a computerised device, cause the computerised device to perform a method of processing communication sessions in a virtualised environment in a telecommunications network, the method comprising:
providing a virtualised environment comprising a first active virtual machine having a dedicated backup virtual machine and a second active virtual machine sharing a backup virtual machine with a third active virtual machine different to the second active virtual machine;
at a communication session classifier, determining whether a communication session is of a predetermined type;
in response to a positive determination, causing the communication session to be processed at the first virtual machine; and
in response to a negative determination, causing the communication session to be processed at the second virtual machine.

Clause 24. A method of processing communication sessions in a telecommunications network, the method comprising:
providing an environment in the telecommunications network, the environment comprising a first active node having a dedicated backup node and a second active node sharing a backup node with a third active node different to the second active node;
at a communication session classifier, determining whether a communication session is of a predetermined type;
in response to a positive determination, causing the communication session to be processed at the first active node; and
in response to a negative determination, causing the communication session to be processed at the second active node,
wherein communication sessions of the predetermined type comprise emergency calls.

Clause 25. A method according to clause 24, wherein at least one of the first, second and third active nodes comprises a virtual machine.

Clause 26. A method according to clause 24 or clause 25, wherein at least one of the first, second and third active nodes comprises a physical server.

What is claimed:

1. A method of processing communications data in a virtualized computing environment of a telecommunications network, the virtualized computing environment comprising a cluster of virtual machines or containers with a one-to-one ratio of active and backup virtual machines or containers, and one or more additional clusters of virtual machines or containers having a N-to-K ratio of active and backup virtual machines or containers where N indicates a relative number of active virtual machines or containers in the N-to-K ratio and K indicates a relative number of backup virtual machines or containers in the N-to-K ratio and where N>K, the backup virtual machines or containers configured to provide failover capacity for processing communications sessions in an event of a failure of one of the active virtual machines or containers, the method comprising:
for each of the clusters, determining a cluster redundancy capability indicative of the ratio of the active and backup virtual machines or containers for that cluster;
receiving data indicative of a requested communication session of the telecommunications network;
determining a predetermined type associated with the requested communication session, the predetermined type indicative of a priority of the requested communication session;
selecting a cluster of the virtualized computing environment having a cluster redundancy capability corresponding to the predetermined type; and
sending data for the requested communication session to an active virtual machine or container in the selected cluster.

2. The method according to claim 1, wherein communication sessions of the predetermined type comprise emergency calls.

3. The method according to claim 1, wherein the method is performed by a communication session classifier located in a load balancer.

4. The method according to claim 1, wherein one or more of the active virtual machines or containers are configured to provide a signaling plane processing function for communication sessions.

5. The method according to claim 1, wherein the method is performed by a communication session classifier located in a signaling plane processing function.

6. The method according to claim 1, wherein one or more of the active virtual machines or containers are configured to provide a media plane processing function for communication sessions.

7. The method according to claim 6, wherein the method is performed by a communication session classifier located in the media plane processing function.

8. The method according to claim 1, wherein at least one of the active virtual machines or containers provide a session border controller (SBC) function in the telecommunications network.

9. The method according to claim 1, further comprising, in response to determining that a first process performed by an active virtual machine or container of the selected cluster has failed, performing a first failover procedure comprising configuring the first process to be performed by a backup virtual machine or container of the selected cluster.

10. The method according to claim 1, wherein the determination is based on one or more of a telephone number associated with the requested communication session, one or more dialing digits, a communication session source priority, a communication session destination priority, or a billing history.

11. The method according to claim 1, wherein at least one of the active virtual machines or containers is configured to run on a dedicated physical server.

12. The method according to claim 1, wherein the N-to-K ratio is determined based on one or more of an expected risk of virtual machine or container failure, a speed of recovery from the virtual machine or container failure, or data center reliability.

13. The method according to claim 1, wherein the N-to-K ratio is dynamically updated based on redundancy capabilities reported by the virtual machines or containers.

14. A system for use in processing communication sessions in a virtualized environment in a telecommunications network, the virtualized computing environment comprising a cluster of virtual machines with a one-to-one ratio of active and backup virtual machines, and one or more additional clusters of virtual machines having a N-to-K ratio of active and backup virtual machines where N indicates a relative number of active virtual machines or containers in the N-to-K ratio and K indicates a relative number of backup virtual machines or containers in the N-to-K ratio and where N>K, the backup virtual machines configured to provide failover capacity for processing communications sessions in an event of a failure of one of the active virtual machines, the system comprising:
one or more processors; and
a memory in communication with the one or more processors, the memory having computer-readable instructions stored thereupon that, when executed by the one or more processors, cause the system to perform operations comprising:
for each of the clusters, determining a cluster redundancy capability indicative of the ratio of the active and backup virtual machines for that cluster;
receiving data indicative of a requested communication session of the telecommunications network;
determining a predetermined type associated with the requested communication session, the predetermined type indicative of a priority of the requested communication session;
selecting a cluster of the virtualized computing environment having a cluster redundancy capability corresponding to the predetermined type; and
sending data for the requested communication session to an active virtual machine in the selected cluster.

15. A non-transitory computer-readable medium comprising a set of instructions, which, when executed by a computing device, cause the computing device to perform operations in a virtualized computing environment of a telecommunications network, the virtualized computing environment comprising a cluster of virtual machines with a one-to-one ratio of active and backup virtual machines, and one or more additional clusters of virtual machines having a N-to-K ratio of active and backup virtual machines where N indicates a relative number of active virtual machines or containers in the N-to-K ratio and K indicates a relative number of backup virtual machines or containers in the N-to-K ratio and where N>K, the backup virtual machines configured to provide failover capacity for processing communications sessions in an event of a failure of one of the active virtual machines, the operations comprising:
for each of the clusters, determining a cluster redundancy capability indicative of the ratio of the active and backup virtual machines for that cluster;
receiving data indicative of a requested communication session of the telecommunications network;
determining a predetermined type associated with the requested communication session, the predetermined type indicative of a priority of the requested communication session;
selecting a cluster of the virtualized computing environment having a cluster redundancy capability corresponding to the predetermined type; and
sending data for the requested communication session to an active virtual machine in the selected cluster.

16. The non-transitory computer-readable medium according to claim 15, wherein communication sessions of the predetermined type comprise emergency calls.

17. The non-transitory computer-readable medium according to claim 15, wherein the N-to-K ratio is determined based on one or more of an expected risk of virtual machine or container failure, a speed of recovery from the virtual machine or container failure, or data center reliability.

18. The non-transitory computer-readable medium according to claim 15, wherein one or more of the active virtual machines or containers are configured to provide a signaling plane processing function for communication sessions.

19. The non-transitory computer-readable medium according to claim 15, wherein the N-to-K ratio is dynamically updated based on redundancy capabilities reported by the virtual machines or containers.

20. The non-transitory computer-readable medium according to claim 15, wherein one or more of the active virtual machines or containers are configured to provide a media plane processing function for communication sessions.

\* \* \* \* \*